United States Patent
Smith, Jr.

[11] Patent Number: 5,186,121
[45] Date of Patent: Feb. 16, 1993

[54] METHOD OF AND APPARATUS FOR USE IN THE DEPURATION OF BIVALVES

[76] Inventor: Franklin L. Smith, Jr., 2394 Old Augusta Rd., North Waldoboro, Me. 04572

[21] Appl. No.: 785,785

[22] Filed: Oct. 31, 1991

[51] Int. Cl.$^5$ ............... A01K 61/00; A01K 63/04
[52] U.S. Cl. ................................ 119/4; 210/748; 251/127
[58] Field of Search ............ 119/2, 3, 4; 210/748, 210/192; 251/127

[56] References Cited

U.S. PATENT DOCUMENTS

| | | | |
|---|---|---|---|
| 3,418,138 | 12/1968 | Dennis et al. | 119/4 |
| 3,641,982 | 2/1972 | Woodridge et al. | 119/4 |
| 3,741,158 | 6/1973 | Moe et al. | 119/3 |
| 3,920,547 | 11/1975 | Garrison et al. | 210/748 |
| 4,007,908 | 2/1977 | Smagghe et al. | 251/127 |
| 4,479,510 | 10/1984 | Bey | 251/127 |
| 4,537,149 | 8/1985 | Ryan | 119/4 |
| 4,559,902 | 12/1985 | Mason et al. | 119/2 |
| 4,653,429 | 3/1987 | Murphy | 119/4 |
| 4,728,368 | 3/1988 | Pedziwiatr | 210/748 |
| 4,774,984 | 10/1988 | Peters | 251/127 |
| 4,968,437 | 11/1990 | Noll et al. | 210/748 |
| 5,043,079 | 8/1991 | Hallett | 210/748 |

Primary Examiner—John G. Weiss

[57] ABSTRACT

Method of and apparatus for use in the depuration of bivalves requires an underground tank for a substantial volume of seawater and is divided into upper and lower sections by a transverse filter. A series of treatment tanks are provided for batches of bivalves dug in a polluted area. Water is pumped continuously from the lower section of the underground tank to the treatment tanks after being filtered and disinfected by ultraviolet light and is returned to the upper section of the underground tank after passing through an open filter. All above ground portions of the apparatus are shielded against sunlight. The circulating water is continuously aerated. Sources of aerobic bacteria are added to each filter. The temperature, salinity, dissolved oxygen and pH of the seawater is maintained at levels appropriate for the bivalves.

15 Claims, 7 Drawing Sheets

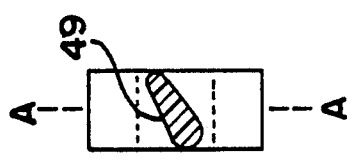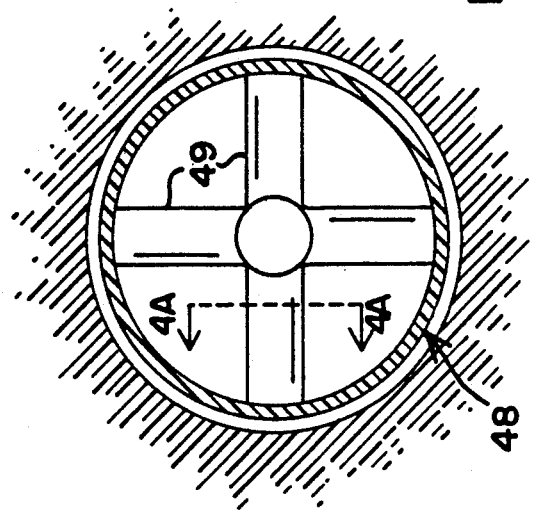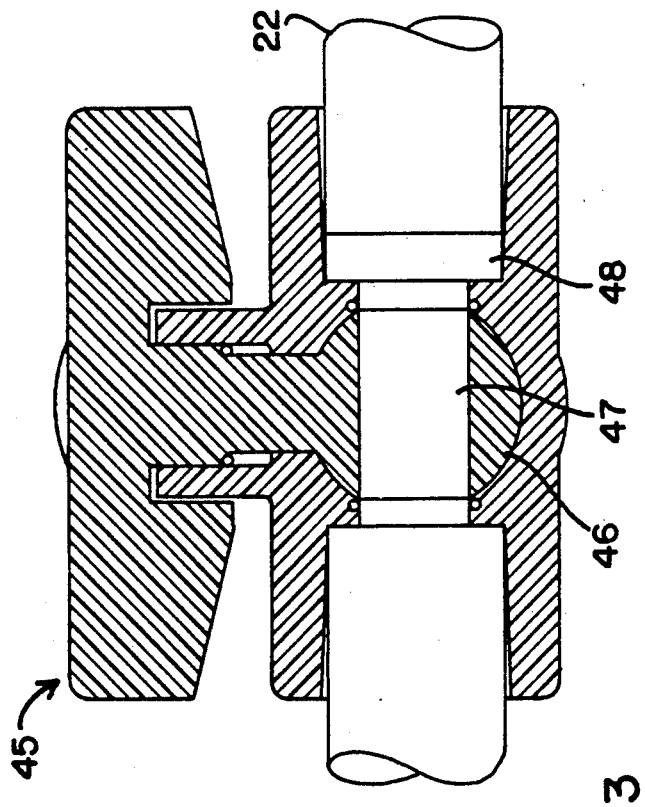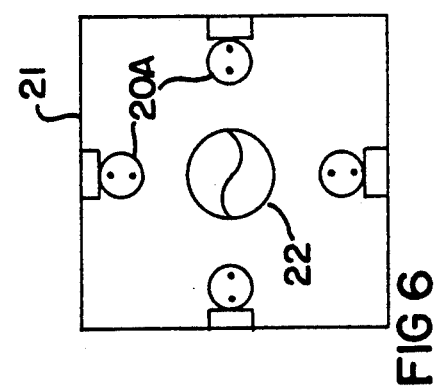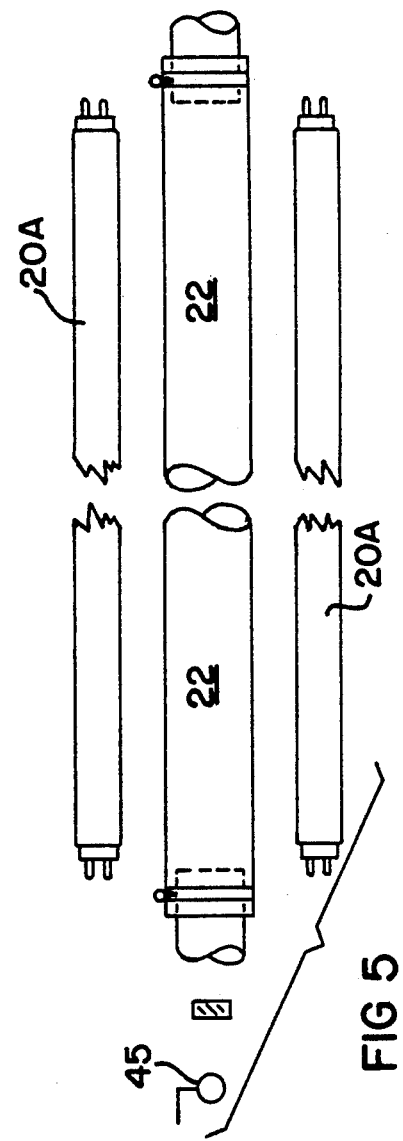

METHOD OF AND APPARATUS FOR USE IN THE DEPURATION OF BIVALVES

BACKGROUND OF THE INVENTION

With increasing frequency, it has been necessary for state health authorities to close areas against the removal of bivalves therefrom because such areas have become polluted.

It is well known that the depuration of bivalves can be effected in 48 hours by exposing them to flowing unpolluted seawater closely corresponding to the seawater from which the bivalves were taken with respect to temperature, dissolved oxygen content, pH and salinity.

Depuration of bivalves can thus be effected by transporting them from a polluted area to an adjacent unpolluted area and using water therefrom in their treatment but with the risk of polluting that area with bacteria carried in the discharged water.

In prior proposals of which I am aware, the seawater being used has been subjected to ultraviolet radiation before or during the time when the bivalves were being treated therewith. For example, U.S. Pat. No. 3,641,982 provided an open end system in which water being discharged was also subjected to ultraviolet radiation. In U.S. Pat. No. 4,537,149, a closed system provided that the circulating seawater was also filtered and in U.S. Pat. No. 4,653,429, the seawater was derived from an aquifier and the container for the bivalves was exposed to ultraviolet radiation, after each batch was treated.

THE PRESENT INVENTION

The general objective of the present invention is to effect the depuration of bivalves without the limitations of present and proposed practice and to provide method and apparatus enabling a system to be continuously operated to depurate large volumes of bivalves on a commercial basis.

In accordance with the invention, this general objective is attained by placing a tank underground in a manner such as to provide year long thermal insulation therefor. The tank is one having a volumetric capacity of several thousand gallons of seawater, and is divided by a transverse filter into upper and lower sections.

The remainder of the system is above ground, shielded against sunlight and includes pumping means operable to withdraw seawater from the lower section of the underground tank and continuously deliver the withdrawn water through a filter, a zone where the water is exposed to ultraviolet radiation and then into whichever ones of a series of parallel treatment tanks contains bivalves supported on screened trays. Water is returned from these tanks into the upper section of the underground tank after passing through an open filter.

While the method and the general requirements of the apparatus are apparent from the foregoing, there are several important aspects of the invention to be summarized for its more complete appreciation. It should be noted that each treatment tank is dimensioned to support a substantial number of trays and the capacity of the treating tanks is such that each can accommodate several bushels of bivalves, and in practise, when the bivalves in a tank have been treated for 48 hours, they may be removed and replaced by bivalves freshly obtained from a polluted area with the water necessarily introduced with them useful in maintaining the salinity and the pH of the circulating water acceptable to the bivalves.

A feature of the invention of particular importance to the effectiveness of the ultraviolet treatment is that the water being treated is rendered turbulent.

A particular objective of the invention is to provide an ultraviolet treatment zone in which a large volume of flowing water can be disinfected. By way of example, with a flow rate of 140 gallons a minute, the piping must be rigid and of a material not readily penetrated by ultraviolet radiation. For that reason, a manifold or header is provided with a parallel series of lengths of flexible tubing easily penetrated by ultraviolet radiation and each length of tubing is joined to a downstream manifold by a coupling creating a head preventing partial collapse of the tubing lengths.

In order that the seawater of the system will have indefinite life, an important aspect of the invention is that each filter contains a layer of crushed oyster shells and sources containing aerobic bacteria, the bacteria thriving on ammonia and other wastes derived from the bivalves and clinging to the crushed oyster shells.

The circulating water must be suitably aerated and air is delivered continuously into the lower section of the underground tank for that purpose and also to air lift seawater to the upper section and there be subjected to activated carbon filtration to eliminate carbon dioxide from the water delivered to the treatment tanks.

Other objectives of the invention and the manner of their attainment will be apparent from the following description of the presently preferred embodiment and the claims.

BRIEF DESCRIPTION OF THE DRAWINGS

The accompanying drawings illustrate the presently preferred embodiment of the invention and FIGS. 1A and 1B taken together, show somewhat schematically apparatus enabling the method to be practised;

FIG. 3 is a longitudinal section taken through anyone of the ball valves and the turbulator at the infeed end of the ultraviolet water treating zone;

FIG. 4 is a view of one of the discharge sides of the turbulator;

FIG. 4A is a section of the turbulator taken approximately along the indicated line 5—5 of FIG. 4;

FIG. 5 is a somewhat schematic view of the section of the apparatus where the filtered seawater is subjected to ultraviolet light;

FIG. 6 is a schematic view illustrating the lamp arrangement relative to each length of flexible tubing;

THE PREFERRED EMBODIMENT

Figure 2:
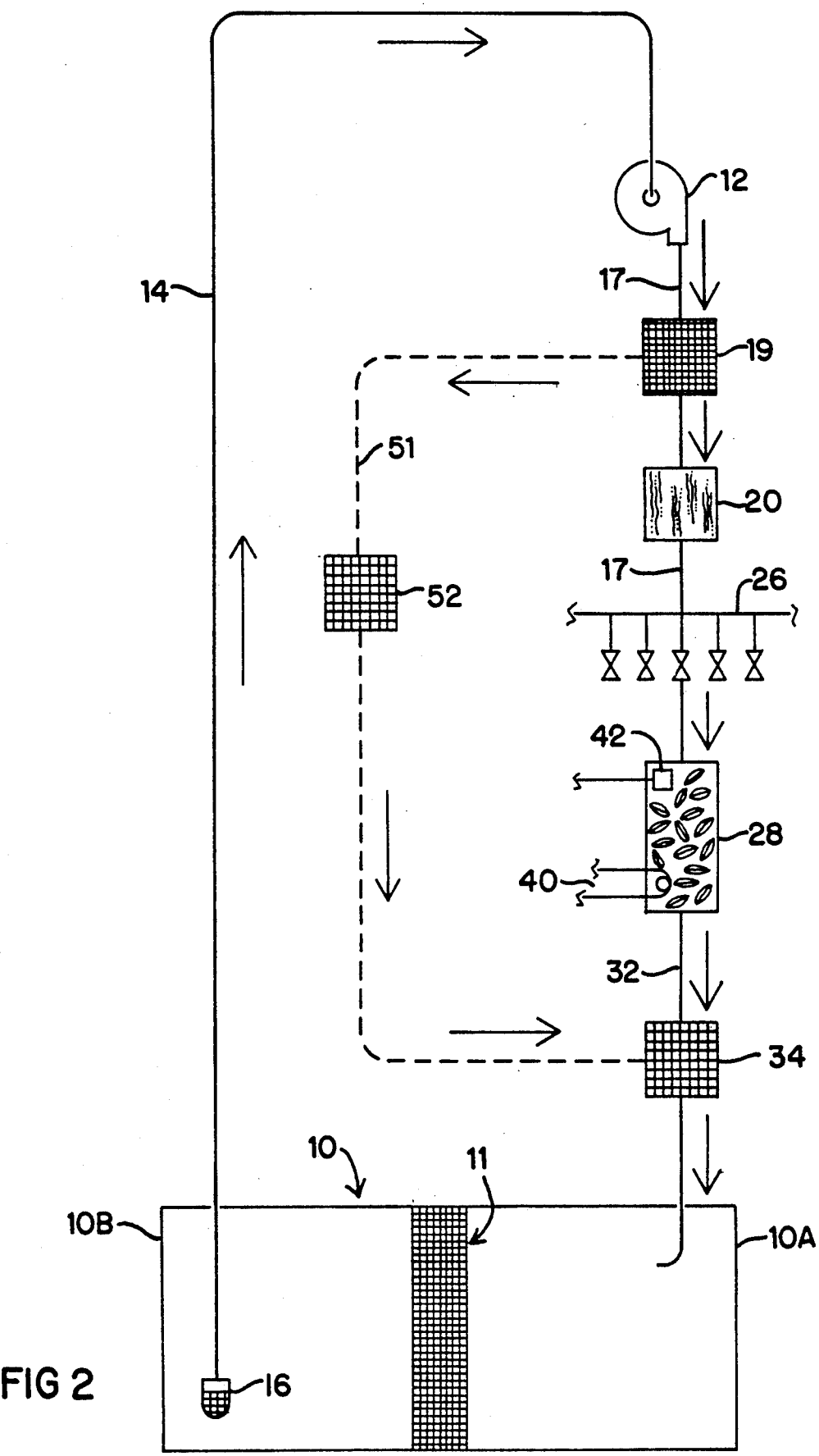
FIG. 2 is a flow chart illustrating the general path of the seawater in treating bivalves.

The description of the apparatus and its operation is best initiated with reference to FIG. 2 which includes major components in the flow path of the seawater delivered from the tank section 10B of the underground tank 10 to the area where bivalves are continuously treated which is represented by the single tank 28 with the seawater returned from that area to the section 10A of the underground tank. All of the equipment that is above ground is shielded against sunlight being housed in a windowless building, not shown, which is air conditioned and provided with any suitable means to heat it to maintain the ambient temperature at 60° F.

Figure 1A:
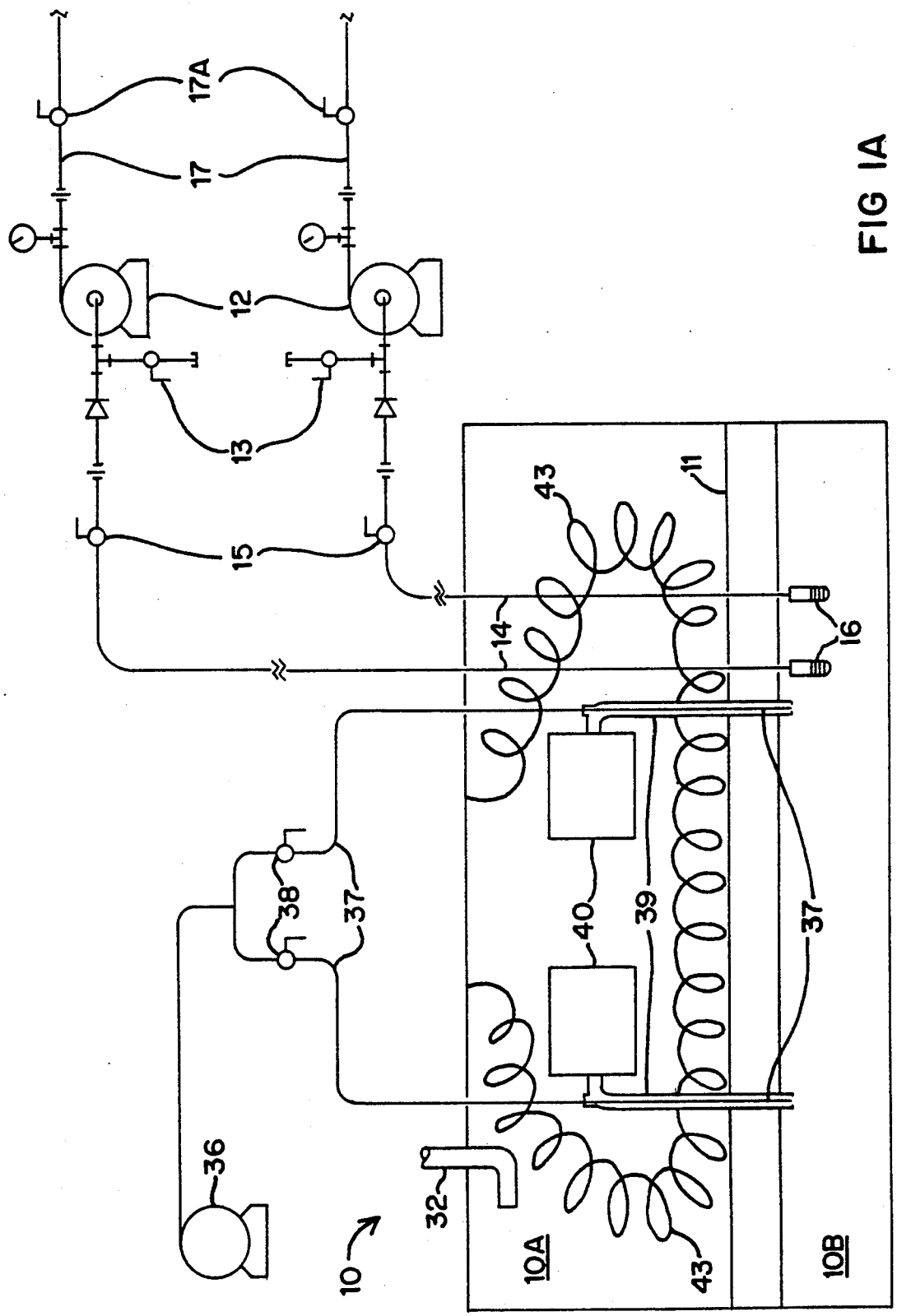
FIG. 1C is a somewhat schematic view of the ultraviolet treatment assembly.
Figure 1B:
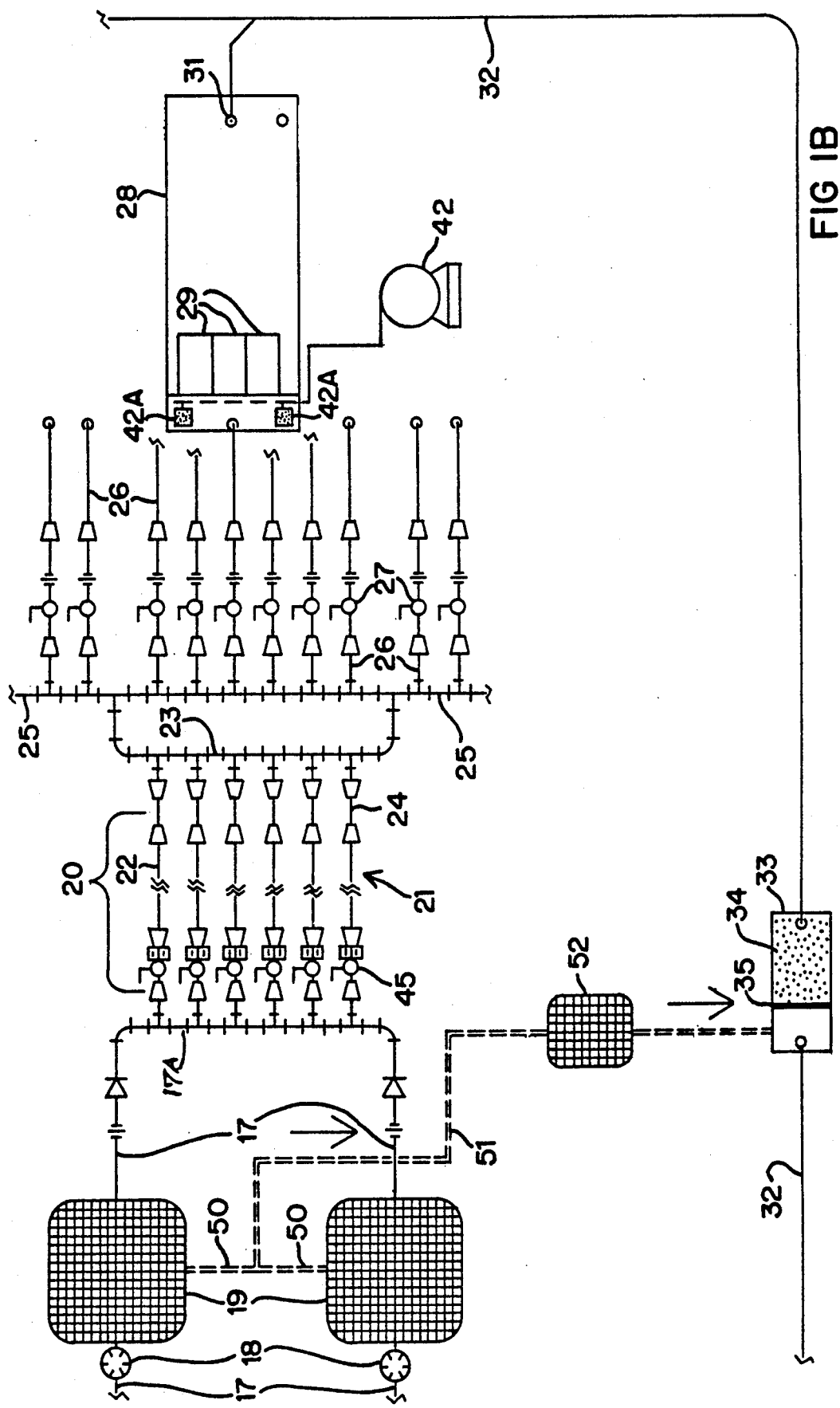
Figure 1C:
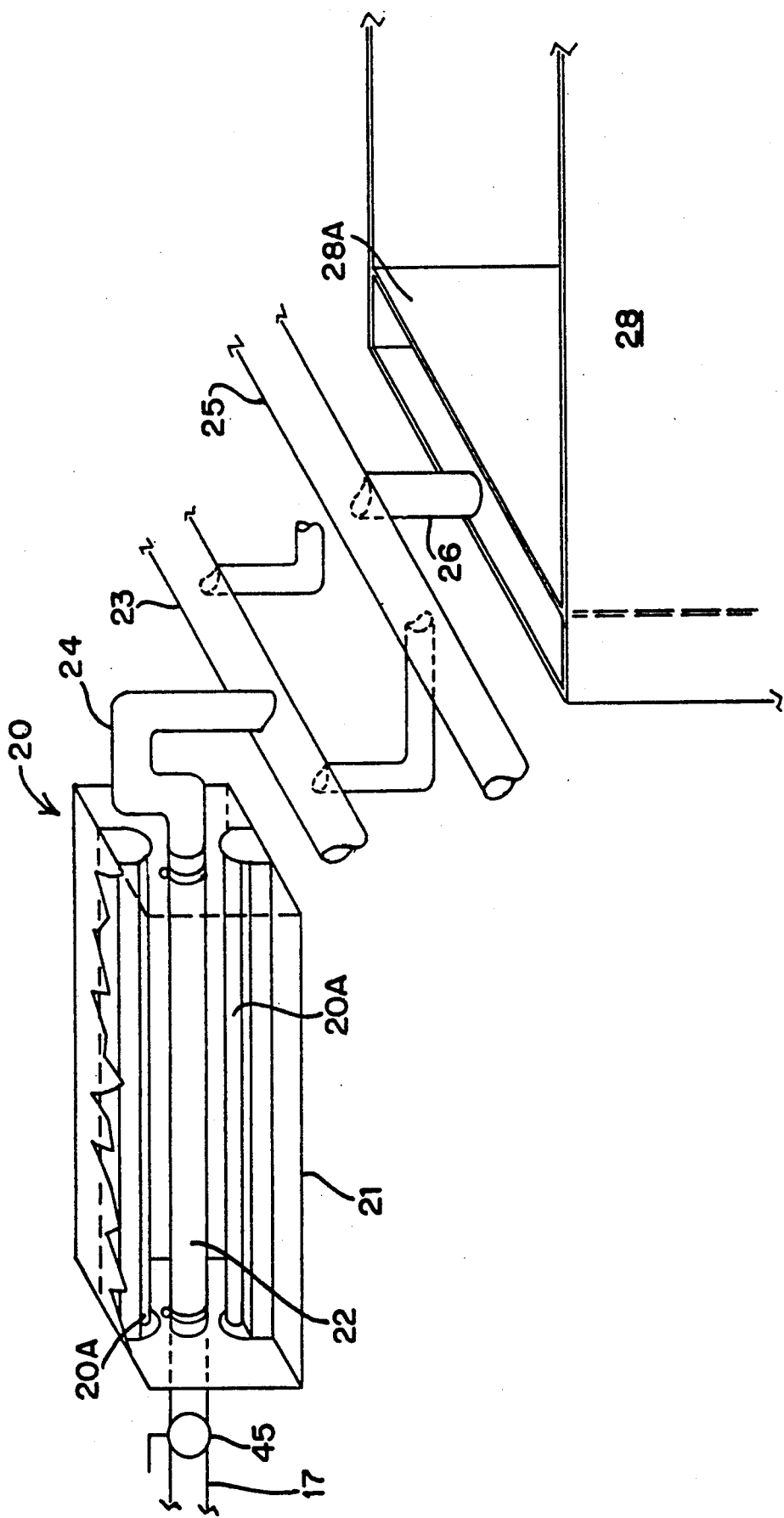

FIGS. 1A and 1B provide schematic details of the components included in the flow path to and from the bivalve treatment tanks and other components of the apparatus such as those which maintain the quality of the seawater indefinitely such as aeration, temperature control, elimination of carbon dioxide and the establishment and maintenance of aerobic bacteria in the filters for the consumption of bivalve secretions.

The holding or storage fiberglass tank 10 of a 12,000 gallon capacity is buried, in practise, about sixteen feet deep to be well below the frost line, and is filled with seawater taken from a pollution free area. The depth at which the tank is buried provides a thermal layer against freezing temperatures in winter months and against overheating during summer months although the seawater in use usually requires cooling from time to time as the water to which the bivalves are exposed is desirably maintained between 50° and 58° F. and is subject to being heated by the air within the building. At least in the northeast, no other tank insulation is necessary other than the overlying earth layer.

A necessary feature of the tank 10 is that it is divided into an upper section 10A and a lower section 10B by a horizontal filter, generally indicated at 11, of a multi-layer, multi-media layer type and later detailed with reference to FIG. 9.

Two pumps 12 to be used in the alternative, are located within the building and have valve controlled priming water inlets 13 and intakes 14, provided with valves 15, extending downwardly into the tank 10 through the horizontal filter 11 and into the tank section 10B with the intake end of each provided with a foot valve 16. Each pump 12 is operable to lift water from the tank section 10B and discharge it at the rate of 150 gallons per minute.

The discharge conduit 17 of each pump 12 is provided with a multi-position valve, generally indicated at 18, the functions of which positions are later detailed. At this point, however, it is only necessary that each valve 18 is adjustable to permit flow through a sand filter 19 and thence to and through an ultraviolet treatment system generally indicated at 20. Each valve 18 and its associated filter 19 is, in practise, manufactured by Pac-Fab Corporation of Cleveland, Ohio. The filter 19 is a "Triton" sand filter, model TR-140.

Each part of the conduits 17 is, in practise, two inch PVC (polyvinylchloride) tubing which is resistant to ultraviolet radiation. In order that the seawater passing through the system 20 will be disinfected, the system 20 includes an upstream manifold 17A. Each of a parallel series of sections 21 encloses a length 22 of two inch tubing which radiation from the ultraviolet lamps 20A will penetrate and is connected to the manifold 17A. In practise, the tubing lengths 22 are Teflon (polytetrofluro-ethylene). Each tubing length 22 is surrounded by a group of four ultraviolet lamps 20A within the section 21 and equally spaced relative to the tubing. The lamps 20A in use are 20 watt, Sylvania "Germicid" lamps.

The tubing lengths 22 are connected to a downstream manifold 23 by couplings 24 each of which is in the form of an inverted U and functions to maintain heads to prevent the collapse of the tubing lengths.

A valve 45 at the infeed end of each tubing length 22 not only controls the seawater flow through that length but also includes a turbulator 48 provided with vanes 49 by which a swirling action is imparted to water flowing therethrough. The valves 45 are preferably ball valves, the ball 46 of each having a diametrical bore 47. The ball can be turned between positions blocking flow through the valve into positions permitting such flow. As the ball is turned in a direction to permit such a flow, the flow is initially at an angle opposite the inclination of the turbulator vanes 49, maximizing the turbulence.

Relative to the remainder of the equipment, the ultraviolet treatment system 20 is elevated and the manifold 23 is connected at its ends to a lower level manifold 25 having a series of conduits 26, each controlled by a valve 27 and disposed to discharge seawater downwardly into a treatment tank 28 on the upstream side of its baffle 29. Ten conduits 26 are shown in FIG. 1B with but one treatment tank 28 shown, the other nine tanks 28 omitted to simplify the drawings. The manifold 25 is shown of a length such that a number of additional conduits 26 can be added, if needed.

Each tank 28 has a vertically adjustable overflow 31 connected to a return line 32. The treatment tanks 28 of the present apparatus are eight and one half feet long, four feet wide and two feet deep, each with a baffle 28A spaced one half foot from the infeed ends of the tanks and providing a four inch gap below it. The bivalves are held during treatment on screen trays 29, each two feet wide and four feet long. The usual full load of bivalves in each tank is about eighteen bushels and the required per bushel water flow through a tank must be at least one gallon per minute per bushel. Each tray 29 can accommodate at least one half a bushel, with a maximum capacity of about three quarters of a bushel.

Figure 8:
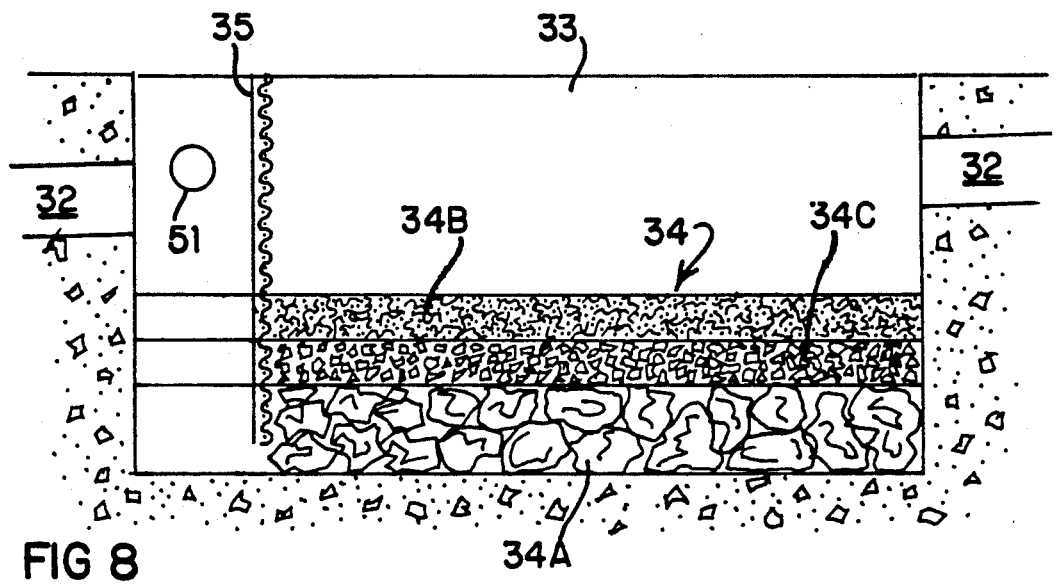
FIG. 8 is a vertical section taken lengthwise of the open filter.

The return line 32 has an open section 33 containing a multi-layer filter 34, see FIG. 8, and a downstream baffle 35 enabling foreign matter to be removed manually from time to time from the open section. After passing under the baffle 35, the seawater is returned to the upper section 10A of the underground tank 10.

The necessary aeration of the seawater is preferably effected in the section 10B of the underground tank 10. For that purpose, see FIG. 1A, a compressor 36 is provided with spaced apart air lines 37 equipped with valves 38 with both lines 37 extending into the upper section 10A of the underground tank 10. Each line 37 extends downwardly through the closed end of an air lift tube 39 which extends through the filter 11 and into the lower section 10B of the underground tank. The open end of each air lift tube 38 extends slightly beyond the open end of the airline 37 within it. Air lifts are thus provided by which aerated water is raised and discharged into and through an activated carbon filter 40 in the upper tank sections 10A and connected to the air lift tubes adjacent their closed end. The filters 40 discharge towards each other and the filters 40 are effective to absorb carbon dioxide.

It is also the practice to enable the water which is to flow over the bivalves held by trays in the treatment tanks 28 to be aerated, if needed. For that purpose, a branch air line 41 for each treatment tank 28 from a compressor 42 extends into each such tank on the upstream side of its baffle 28A and there discharges air through spaced apart diffusers 42A into the incoming seawater. This arrangement avoids stirring up sediments in the treatment tanks 28 from the batch of bivalves being treated.

The temperature of the seawater by which the bivalves are treated is critical and must be held for best results between 55° and 58° F. It has never been found necessary to heat the water but sometimes it has been necessary to cool it in spite of the controlled temperature in the building. It has been found to be more efficient to utilize a cooling system employing a coil or coils 43 in the tank 10 than in the treatment tanks 28.

Figure 7:
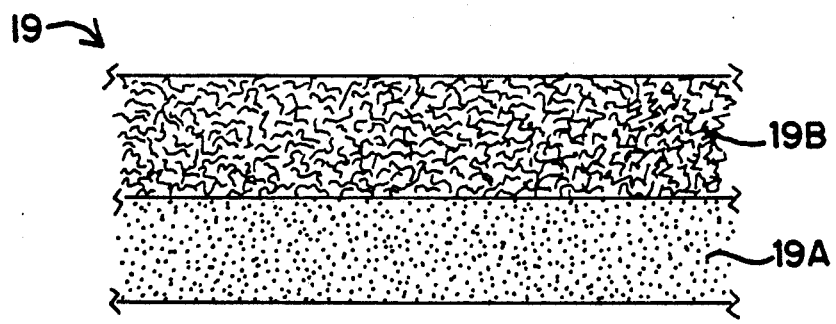
FIG. 7 is a fragmentary vertical section taken lengthwise of the sand filter.
Figure 9:
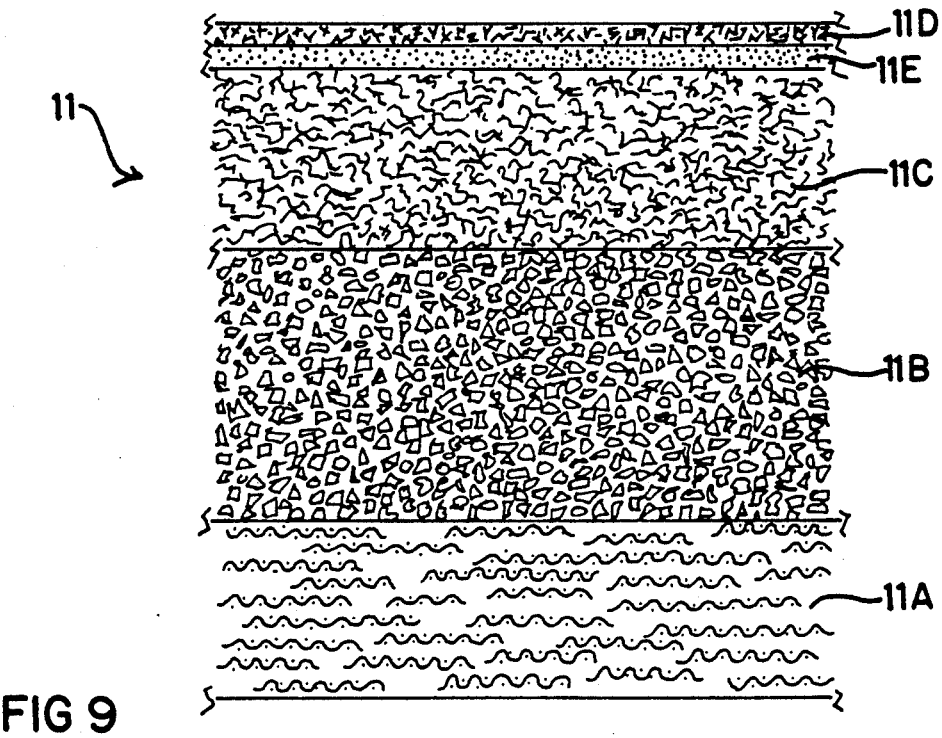
FIG. 9 is a fragmentary vertical section through the filter in the holding or storage tank.
Figure 10:
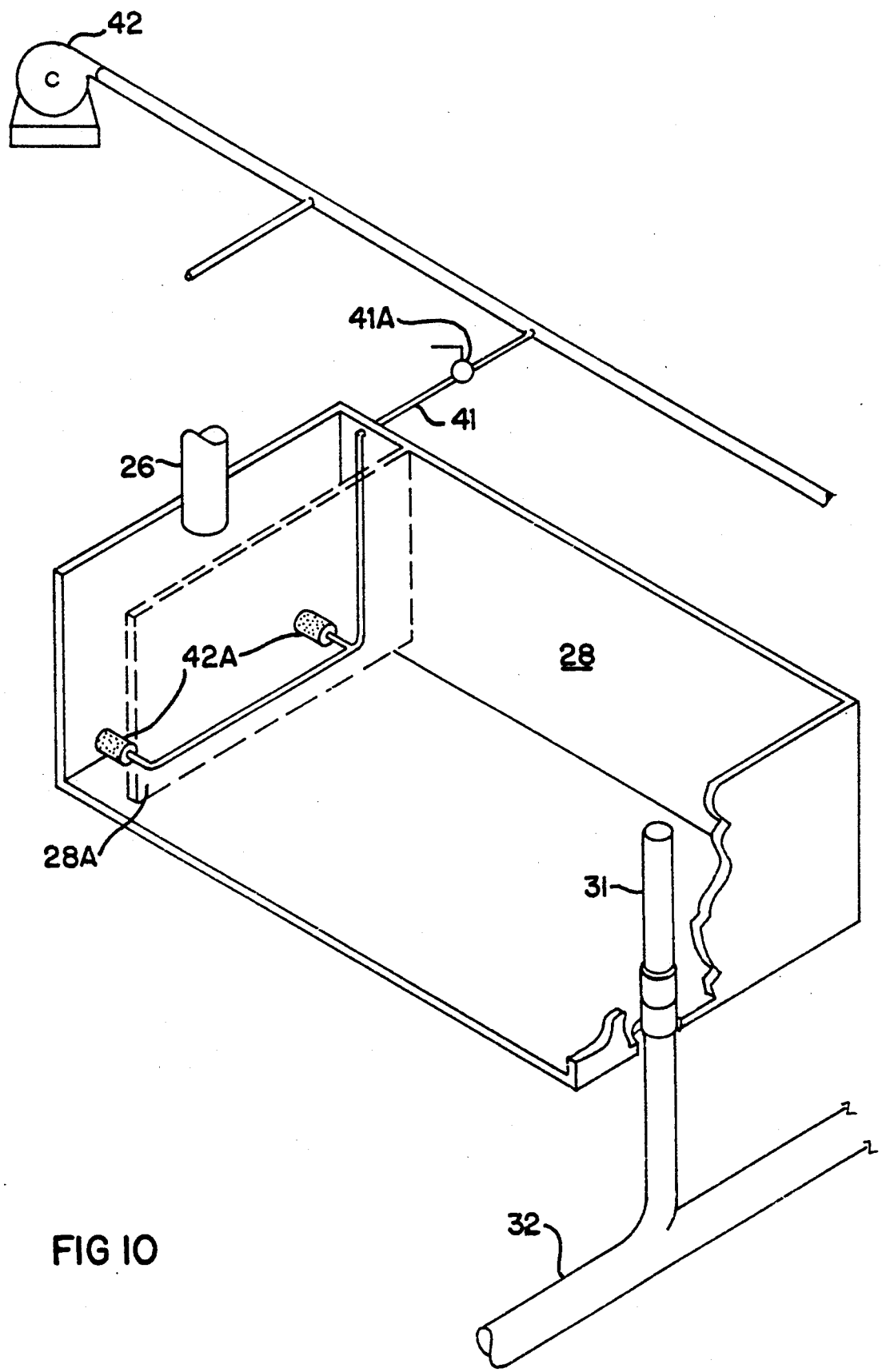
FIG. 10 is a view of one of the treating tanks with its walls broken away to show features thereof.

The composition of each of the filters 19, 34 and 11 is important and is shown in FIGS. 7, 8 and 9, respectively.

The filter 19 consists of a layer 19B of crushed oyster shells, on a layer of sand 19A and are, as the filter is presently composed, respectively eight inches and seven inches thick.

In the case of the open filter 34, there is a base layer 34A eight inches thick of granite stones in the six to eight inch size range, a surface layer 34B, four inches thick, of crushed oyster shells and an intermediate layer 34C of four inches composed of crushed granite of three quarter inch size.

The filter 11 has a supporting fiberglass screened platform 11A formed in the tank 10 on which there is a three inch layer of crushed stone of a three quarter inch particle size on top of which is a two inch layer 11C of crushed oyster shells. In practise, a thin covering overlies the crushed oyster shell layer 11C and consists of a surface layer of diatomaceous earth 11D and an underlying layer 11E of sand, both about one quarter of an inch thick.

The established limitless, useful life of the saltwater and the filters is dependent on the fact that each filter is supplied with a source of aerobic bacteria which consume bivalve secretions.

In practise, the aerobic bacteria are supplied to the several filters by means of a preparation of blended chopped bivalve bellies which have been tested free of total coliform and *E-coli* bacteria. In the presently operating system, chopped clam bellies. The chopped meat is allowed to stand for five days at room temperatures until they begin to decay when they are blended with sterile seawater, in practice, equal parts of the chopped meat and sterile seawater. When this bacteria source material is added to the filters, bacteria growth on the crushed oyster shells insures that bivalve secretions including ammonia and nitrites are changed to nitrates which are harmless to bivalves, are consumed with the result that the circulating seawater is potable with respect to the bivalves.

From the above, the method and the apparatus of the invention will be understood without further explanantion. It should be noted however that the bivalves treated in accordance with the invention have been clams, but could be used with other polluted bivalves. The practise of the invention commenced on January, 1991 and the operation has been continuous since then with batches of freshly dug clams from polluted areas added as batches of depurated clams are removed and taken to customers. Each batch is confined to one or more of the treatment tanks 28 for the 48 hours required for their depuration and, in practise, on each business day, a depurated batch of clams is ready for the market unless weather conditions have interfered with harvesting.

Each day, the seawater is tested as to temperature, salinity, dissolved oxygen content, its pH and also turbidity. During the operation of the equipment, it has been found that as each batch of clams is introduced, enough "new" seawater is added to maintain the quality of the seawater. In addition, inspection by State of Maine Department of Marine Resources representatives is made weekly to test water quality and every season a complete process evaluation of the operation is made by them.

In order that daily checks can be quickly and accurately made of water quality and the condition of the bivalves being treated, it is necessary that there be a laboratory at the plant.

As stated, the temperature of the circulating water should be in the 50° F. to 58° F. range and its temperature can be reduced, if too high, by the use of the cooling coils 43. Salinity must be in the range of 5 to 10 milligrams of salt per liter. Salinity may be increased, if too low, by evaporation by the ambient air the temperature of which may be increased and if too high, fresh water may be added. The dissolved oxygen content can be controlled by adjusting the valves in the air lines or reducing the number of bushels per tank.

While the usual batch of bivalves, clams, in the present case, can be depurated in 48 hours, some batches occasionally require longer treatment. The clams are tested at 0 hour, 24 hour and 48 hour intervals and if they are not on schedule at the time of the 24 hour test, they are transferred to another tank 28 with the treatment started anew. In any event, once a tank 28 is emptied, it is vacuumed cleaned and then rinsed out with incoming water to the return line 32 for removal at the open filter 34.

Other important functions of the valve 18 and the filter 19 in addition to its closed position is that the valve may be set in a position back washing the filter 19 and then set to rinse its upstream surface. In either case, seawater is discharged by outlets 50 into the back wash line 51 and then discharged into a 4 micronfilter 52 and through the open section 33 downstream of the baffle 35.

I claim:
1. The method of depurating bivalves harvested from a polluted area, said method consisting of the steps of establishing an underground body of seawater, dividing the body of the water by a transverse filter into upper and lower sections, providing a bivalve treatment area of a capacity for a substantial number of bushels of bivalves taken from the polluted area, continuously circulating seawater from the lower section of the underground body through the treatment area and over the batch of bivalves therein and back to the upper section thereof, the volume of seawater in the body thereof substantially greater than the volume of water in circulation, filtering the circulating water and then subjecting it to ultraviolet radiation to disinfect the water before reaching the treatment area, filtering the seawater returning to the upper section of the underground body, maintaining aerobic bacteria at each filtering site of a type consuming bivalve secretions, and continuing said circulation for an interval such that the depuration of the bivalves is completed while maintaining the dissolved oxygen content, the pH, temperature and salinity of the water suitable to effect their depuration while shielding the circulating water and the treatment area from sunlight.

2. The method of claim 1 and the step of filtering the returning seawater in an open filter.

3. The method of claim 1 in which the bacteria are provided by mixing substantially equal parts of sterile saline solution and decayed, chopped belly bivalve meat and providing a layer of crushed oyster shells at each filtering site to which the bacteria cling.

4. The method of claim 1 and the step of rendering turbulent the circulating water being subjected to ultraviolet radiation.

5. The method of claim 1 in which the seawater while being subject to radiation is divided into parallel streams confined in flexible tubing, subjecting each stream to separate sources of ultraviolet radiation rendering each stream turbulent while being subject to radiation, and creating a head on each stream.

6. The method of claim 2 and the step of aerating the seawater in the lower section of the body of seawater and utilizing the aeration of the lower section of the body to lift water therefrom into the upper section and there subjecting the lifted water to filtration by activated charcoal.

7. Apparatus for use in depurating bivalves harvested from a polluted area, an underground tank dimensioned to hold a substantial volume of seawater and provided with a transverse filter by which the tank is divided into upper and lower sections, a group of parallel treatment tanks, each dimensioned to accommodate a batch of bivalves and provided with an upstream baffle, means operable to deliver seawater continuously from the lower section of the underground tank and flow water over the batches of bivalves at a rate of at least one gallon per minute per bushel of bivalves, and means to return the seawater from the treatment tanks to the upper section of the undergound tank, said delivery means including a first filter and an ultraviolet radiation assembly operable to effect the ultraviolet radiation of the seawater being delivered and the return means including an open filter, means to aerate the seawater, said filters including a layer of crushed oyster shells and a source of aerobic bacteria derived from chopped bivalve meat, said treatment tanks and the delivery and return means shielded from sunlight.

8. The apparatus of claim 7 in which the zone in which the seawater is subjected to ultraviolet radiation includes means to render the seawater therein turbulent.

9. The apparatus of claim 8 in which the section in which the seawater being delivered to the treatment tank is subjected to ultraviolet radiation includes upstream and downstream manifolds, a series of conduits consisting of lengths of flexible tubing connecting the manifolds and of a type penetratable by the radiation, a turbulator at the upstream end of each tubing length and an inverted U-shaped coupling at the out feed end thereof to maintain a head on the seawater therein, and a plurality of ultraviolet lamps spaced about each conduit between the turbulator and the coupling.

10. The apparatus of claim 9 in which there is a ball valve at the infeed end of each tubing length and the turbulator has a set of vanes angled to effect the swirling of the seawater.

11. The apparatus of claim 10 and an additional manifold is connected thereon at a lower level but above the treatment tanks is connected to said downstream manifold and the additional manifold is provided with valve controlled outlets gravity feeding the water to each of the treatment tanks.

12. The apparatus of claim 7 in which the aerating means effects the aeration of the seawater in the lower section of the underground tanks, the apparatus includes activated carbon filtering means in the upper section of the underground tank, and the aerating means includes an air lift operable to lift aerated water from the lower section and an activated carbon filtering means through which air lifted water is discharged.

13. Apparatus for use in sterilizing a stream of seawater said apparatus including upstream and downstream manifolds, the upstream manifold provided with a stream inlet, a parallel series of flexible conduits between the manifolds and of a type permeable by ultraviolet radiation, a group of ultraviolet lamps spaced about and parallel to each flexible conduit, means housing each flexible tubing and the associated lamps, valve means connecting each flexible conduit to the upstream manifold and operable to create turbulence in water passing there through and a coupling between each flexible conduit and the downstream manifold operable to create a head on the water within the associated flexible conduit.

14. The apparatus of claim 13 in which each coupling includes a portion in the form of an inverted U.

15. The apparatus of claim 13 in which the valve means includes a ball valve and a turbulator in the outlet thereof.

* * * * *